May 22, 1923.

L. SCHAFER

AUTOMOBILE

Filed Nov. 15, 1920

1,455,812

Inventor:
Louis Schafer,
by Pipey & Kingsland
His Attorneys.

Patented May 22, 1923.

1,455,812

UNITED STATES PATENT OFFICE.

LOUIS SCHAFER, OF ST. LOUIS, MISSOURI.

AUTOMOBILE.

Application filed November 15, 1920. Serial No. 424,057.

*To all whom it may concern:*

Be it known that I, LOUIS SCHAFER, a citizen of the United States, residing at St. Louis, Missouri, have invented new and useful Improvements in Automobiles, of which the following is a specification.

This invention relates to improvements in automobiles, and more particularly to a shield or shutter adapted to be mounted so that it may be adjusted to obstruct the vision from the driver's seat, preventing the operation of the vehicle when it is in such adjustment, and being foldable so as to constitute a visor when in a raised adjustment.

Figure 1:
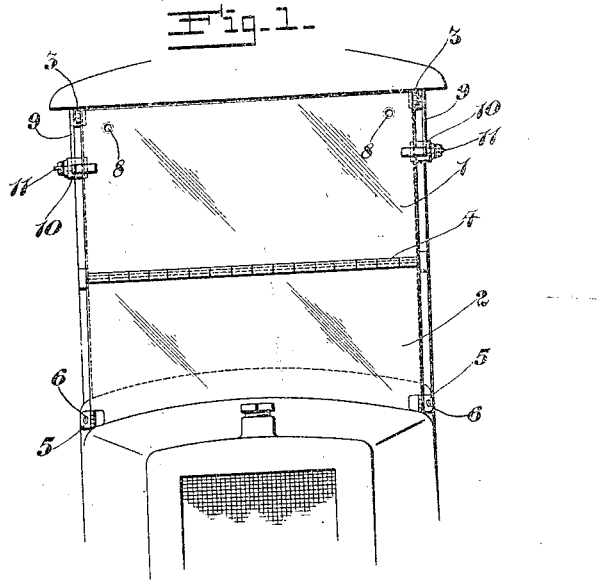

The advantages and novel features of the invention will be apparent from the following detailed description thereof taken in connection with the accompanying drawing, in which Fig. 1 is a front elevation of a portion of an automobile illustrating the device of the invention.

Figure 2:
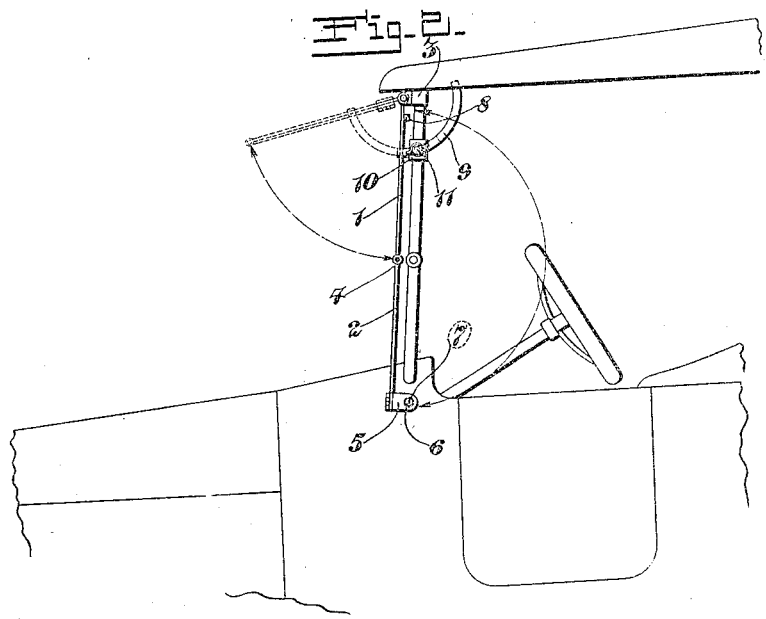

Fig. 2 is a side elevation of the same part.

In the embodiment of the invention illustrated in the drawing the shield or shutter is shown as comprising an upper panel 1 and a lower panel 2. The upper panel has pivot connection in a bracket 3 and in the embodiment shown the bracket 3 is attached to the side frame of the wind shield. While I have illustrated the place of attachment at a point adjacent to the front of the wind shield it will, of course, be understood that the purposes of the invention will be accomplished if the point of attachment is at any place forward of the driver's seat.

The lower panel is hinged by a hinge connection 4 to the upper panel, so that it may be folded in respect thereto. The panels are made of some durable material, such as sheet metal, aluminum or the like, so that they cannot be readily bent or twisted out of place.

Near the lower edge and in the embodiment shown at each side of the lower panel is a hinged strap 5 that carries a tumbler lock 6 adapted to lock into a socket 7 formed in the body of the automobile. Thus the shield or shutter may be extended and the lower edges thereof locked in place. When in this adjustment the shield or shutter constitutes an obstruction to the vision of the operator so that the vehicle cannot be driven when the shield or shutter is down. In this downward adjustment the shield or shutter constitutes an effective thief-proof device, preventing the unwarranted operation of the vehicle. It may also be desired to place on the exterior of the shutter some legend indicating that when the shutter is in this condition the vehicle is being unwarrantedly moved, should an attempt be made to move the vehicle by towing, or otherwise.

In the upper panel there are formed sockets 8 so that when the lower panel is folded backwardly on its hinge, as indicated in dotted lines in Fig. 2, the straps 6 extend over the edge of the upper panel and locks carried by the straps are engaged in the sockets, thereby locking the two panels in folded adjustment. When in this adjustment the shield or shutter may be used as a visor that may be adjusted inwardly or outwardly as desired.

The means for supporting the folded shutter, when functioning as an awning, comprises segmental arms 9 at each side of the shield, said arms operating in brackets 10 supported by the side of the wind shield. A wing screw 11 or other retaining device may be provided to lock the arms 9 in selected adjustments, thereby holding the shield or awning in proper oblique adjustment extending forwardly of the wind shield.

It is to be understood that the construction of the shutter may be varied in numerous particulars without departing from the spirit and scope of the invention. I do not limit myself therefore to the exact construction shown and described, but what I claim and desire to secure by Letters Patent, is:—

1. In an automobile, the combination with a wind shield, of a visor pivotally supported in front of the wind shield and comprising an upper panel and a lower panel pivoted to the upper panel, means for supporting the two panels folded one upon the other in an inclined position as a visor in front of the wind shield, and means for holding the two panels extended in an approximately vertical position in front of the wind shield to obstruct forward vision from the seating portion of the automobile.

2. In an automobile, the combination with a wind shield, of a pair of pivotally united panels one of which is pivotally supported in front of and near the top of the wind shield, means for supporting said panels folded one upon the other in an inclined position as a visor in front of the wind shield, and means for locking said panels in extended and approximately vertical position in front of the wind shield to obstruct forward vision from the seating portion of the automobile.

LOUIS SCHAFER.